United States Patent
Strasser et al.

(10) Patent No.: US 6,738,802 B1
(45) Date of Patent: May 18, 2004

(54) METHOD AND SYSTEM FOR TRANSMITTING DATA AMONG VARIOUS MEMORY UNITS OF POSITION MEASURING DEVICES

(75) Inventors: Erich Strasser, Trostberg (DE); Rudi Mittmann, Tacherting (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 146 days.

(21) Appl. No.: 09/620,158

(22) Filed: Jul. 20, 2000

(30) Foreign Application Priority Data

Jul. 20, 1999 (DE) .......................................... 199 33 963

(51) Int. Cl.[7] .............................................. G06F 15/167
(52) U.S. Cl. ........................ 709/213; 709/212; 345/1.2
(58) Field of Search ............................ 345/1.1, 1.2, 27, 345/863, 864, 331, 204; 709/212, 213; 711/100, 162; 318/601; 399/77, 12; 382/318; 714/3, 26; 700/82; 340/531

(56) References Cited

U.S. PATENT DOCUMENTS

| | | | | |
|---|---|---|---|---|
| 3,710,349 A | * | 1/1973 | Miwa et al. ............... 711/100 |
| 4,564,900 A | * | 1/1986 | Smitt ......................... 709/212 |
| 4,884,103 A | * | 11/1989 | Yamada ....................... 399/77 |
| 5,109,485 A | * | 4/1992 | Smith, Jr. ................... 709/213 |
| 5,123,017 A | * | 6/1992 | Simpkins et al. ............. 714/26 |
| 5,392,447 A | * | 2/1995 | Schlack et al. ............. 345/863 |
| 5,491,540 A | * | 2/1996 | Hirst ........................... 399/12 |
| 5,675,672 A | * | 10/1997 | Nakabayashi ............... 382/318 |
| 5,894,306 A | * | 4/1999 | Ichimura .................... 345/331 |
| 5,896,492 A | * | 4/1999 | Chong, Jr. ..................... 714/3 |
| 5,905,350 A | * | 5/1999 | Hofbauer et al. ........... 318/601 |
| 5,933,347 A | * | 8/1999 | Cook et al. .................. 700/82 |
| 6,170,044 B1 | * | 1/2001 | McLaughlin et al. ....... 711/162 |
| 6,320,502 B1 | * | 11/2001 | Hagl .......................... 340/531 |

FOREIGN PATENT DOCUMENTS

| | | |
|---|---|---|
| DE | 33 18 977 | 11/1984 |
| DE | 36 41 631 | 6/1988 |
| DE | 39 04 917 | 8/1989 |
| DE | 195 03 761 | 8/1995 |
| DE | 195 29 213 | 3/1996 |
| DE | 197 11 218 | 4/1998 |
| DE | 197 11 215 | 5/1998 |
| DE | 197 11 216 | 5/1998 |
| DE | 198 47 381 | 4/1999 |
| EP | 0 660 209 | 6/1995 |

\* cited by examiner

*Primary Examiner*—Steven Saras
*Assistant Examiner*—Uchendu O. Anyaso
(74) *Attorney, Agent, or Firm*—Kenyon & Kenyon

(57) ABSTRACT

A method for transmitting data among various memory units of one or more position measuring devices, specific data pertaining to the position measuring device being stored in the memory units. Data are transmitted via a data transmission line, from a first memory unit into a second memory unit, so that once the data are transmitted, the identical, specific data are at least partially contained in both memory units.

31 Claims, 4 Drawing Sheets

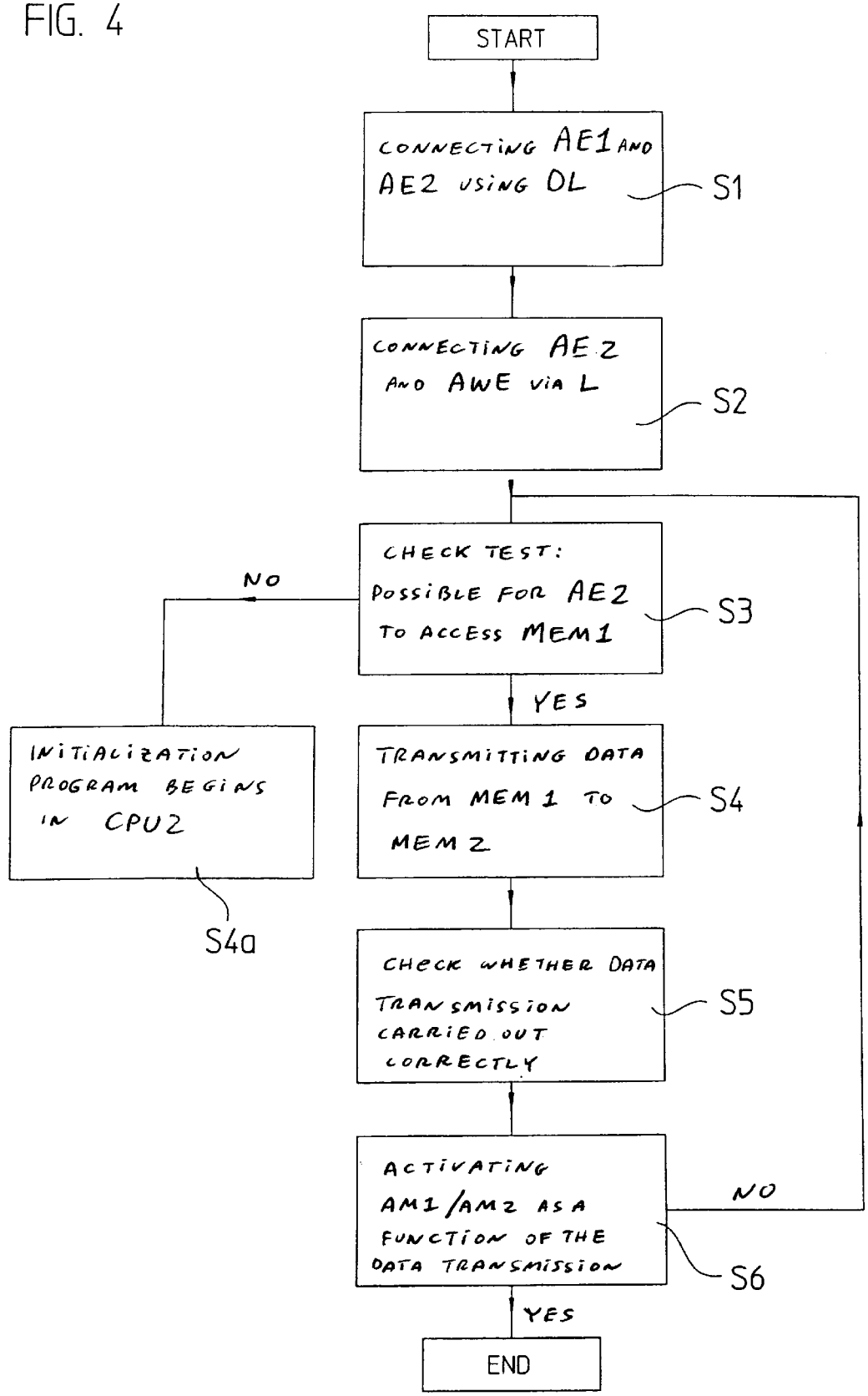

METHOD AND SYSTEM FOR TRANSMITTING DATA AMONG VARIOUS MEMORY UNITS OF POSITION MEASURING DEVICES

The present invention relates to a method, as well as to a system for transmitting data among various memory units of position measuring devices.

DESCRIPTION OF RELATED ART

A memory unit is typically found inside the scanning unit of linear position measuring devices that are based on an optical scanning principle. Generally the memory unit is in the form of an EEPROM. It is customary for data specific to the particular position measuring device to be stored in the memory unit. These data are written into the memory unit either by the current user or by the manufacturer of the position measuring device. The data includes, for instance, data on the zero adjustment, clock pulse number, scale section, and other parameters. When a scanning unit of this kind breaks down, it is necessary to rewrite the specific data required for operation into the memory unit of the replacement scanning unit. This entails a large effort, particularly when working with a large quantity of stored data or measuring system-specific information. Moreover, difficulties can arise when reconstructing the original data.

Similar problems arise when the memory units in question are not disposed in the scanning unit, but elsewhere in the particular position measuring device. This is the case, for example, in rotary position measuring devices.

SUMMARY OF THE INVENTION

The present invention is a simplified and reliable method and system which permits the data in a memory unit being replaced to be passed on to a new memory unit, when replacement of a memory unit of the position measuring device is needed. The present invention provides for an automatic transfer, such as an automatic copying of the data from the first memory unit to be replaced, into the new, second memory unit. This can be more easily done when memory unit replacement is not necessitated by defects in the first memory unit. For example, a replacement can be necessary due to other problems with the scanning unit, when the memory unit is disposed in the scanning unit.

The user-specific data from the first memory unit to be replaced can be accepted rather simply into the new, second memory unit. Generally, such user-specific data cannot be reconstructed by the measuring system manufacturer as easily as the data that had been written into the memory unit by the measuring system manufacturer. It is important then that the replacement can be performed by the user rather than only by the manufacturer.

In addition, the method according to the present invention, permits the user to recognize whether the data transfer has been carried out correctly, or, in some instances, if transfer problems have occurred. It is even possible in one especially advantageous specific embodiment to identify the cause of the errors in the case of an incorrect data transfer. There are several ways in which errors can be recognized or faults can be identified. According to the invention, even in the case of a possibly defective signal processing unit or processor, the data from a scanning unit to be replaced can be automatically transferred into the new memory unit.

Moreover, the embodiments in accordance with the present invention ensure that the electrical consumption of the position measuring device does not rise significantly. This quality is important since, as a rule, the evaluation unit downstream from the position measuring device in question is only designed for supplying power to one single scanning unit.

In one aspect, the invention is a method for transmitting data among memory units of at least one position measuring device, said data being stored in a first one of the memory units, comprising connecting the memory units with a data transmission line, transmitting the data from the first memory unit into a second memory unit, such that after the data are transmitted, the data of the first memory unit are at least partially contained in the second memory unit.

In another aspect, the invention is a system for transmitting data among memory units of at least one position measuring devices, the data being stored in the memory units. The system comprises a data transmission line adapted to connect the memory units to transmit data from a first memory unit into a second memory unit, and means for controlling transmission of the data such that once the data are transmitted, the data of the first memory unit are at least partially stored in the second memory unit.

The present invention is not limited to devices operating on one specific scanning principle for producing positionally dependent signals in the particular position measuring device. Rather, it can be used in optical, magnetic, capacitive, as well as in inductive position measuring devices. In addition, the present invention can also be used in conjunction with position measuring devices where the memory units are disposed in the scanning unit.

BRIEF DESCRIPTION OF THE DRAWINGS

Further advantages as well as details pertaining to the present invention are derived from the following description of an exemplary embodiment, with reference to the enclosed drawings.

In the Drawings:

FIG. 4 is a flow chart showing an exemplary embodiment of the method according to the present invention.

DETAILED DESCRIPTION OF PREFERRED EMBODIMENTS OF THE INVENTION

Figure 1:
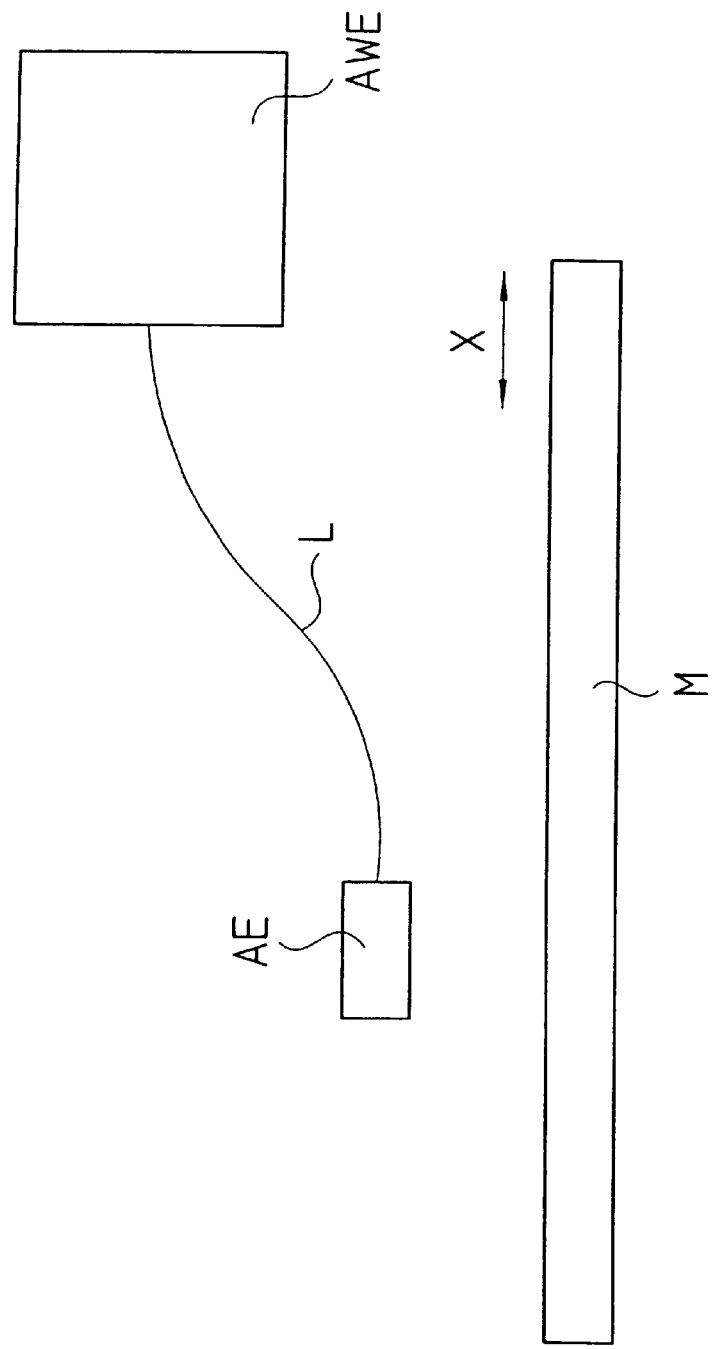
FIG. 1 is a schematic block diagram of a position measuring device.

A schematic block diagram of a position measuring device is shown in FIG. 1. The position measuring device includes a scale M, a scanning unit AE being movably arranged in measuring direction x in relation thereto. By scanning a graduation marking arranged on scale M, position-dependent scanning signals are produced in scanning unit AE and are transmitted via a line L to a downstream evaluation unit AWE for further processing. Further details pertaining to the particular scanning operation are omitted here, since they are not essential to the invention.

The present invention is not dependent upon the type of positionally dependent scanning signals produced. Provision can be made, for example, with the aid of the position measuring device, to produce incremental positional signals, absolute positional signals, combinations thereof, and other types of signals. In the same way, the present invention is not limited to applications in linear measuring arrangements, i.e. it is also possible to use it in rotary measuring arrangements.

The described position measuring device can be preferably used in conjunction with a numerically controlled machine tool, in order, for example, to determine the relative position of the tool and of the workpiece.

Figure 2:
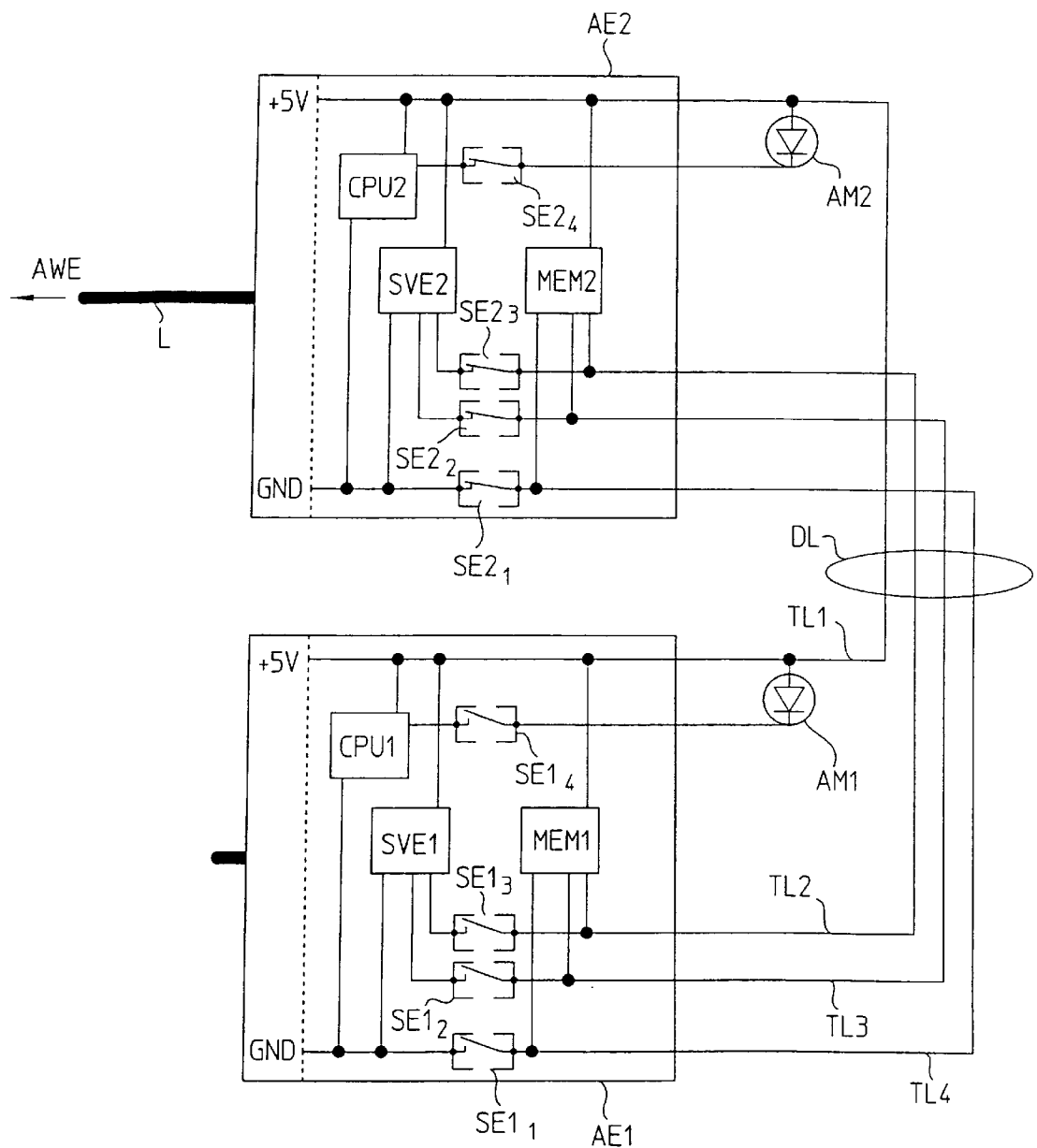
FIG. 2 is a schematic representation of a first and second scanning unit, one unit being used to replace the other.
Figure 3:
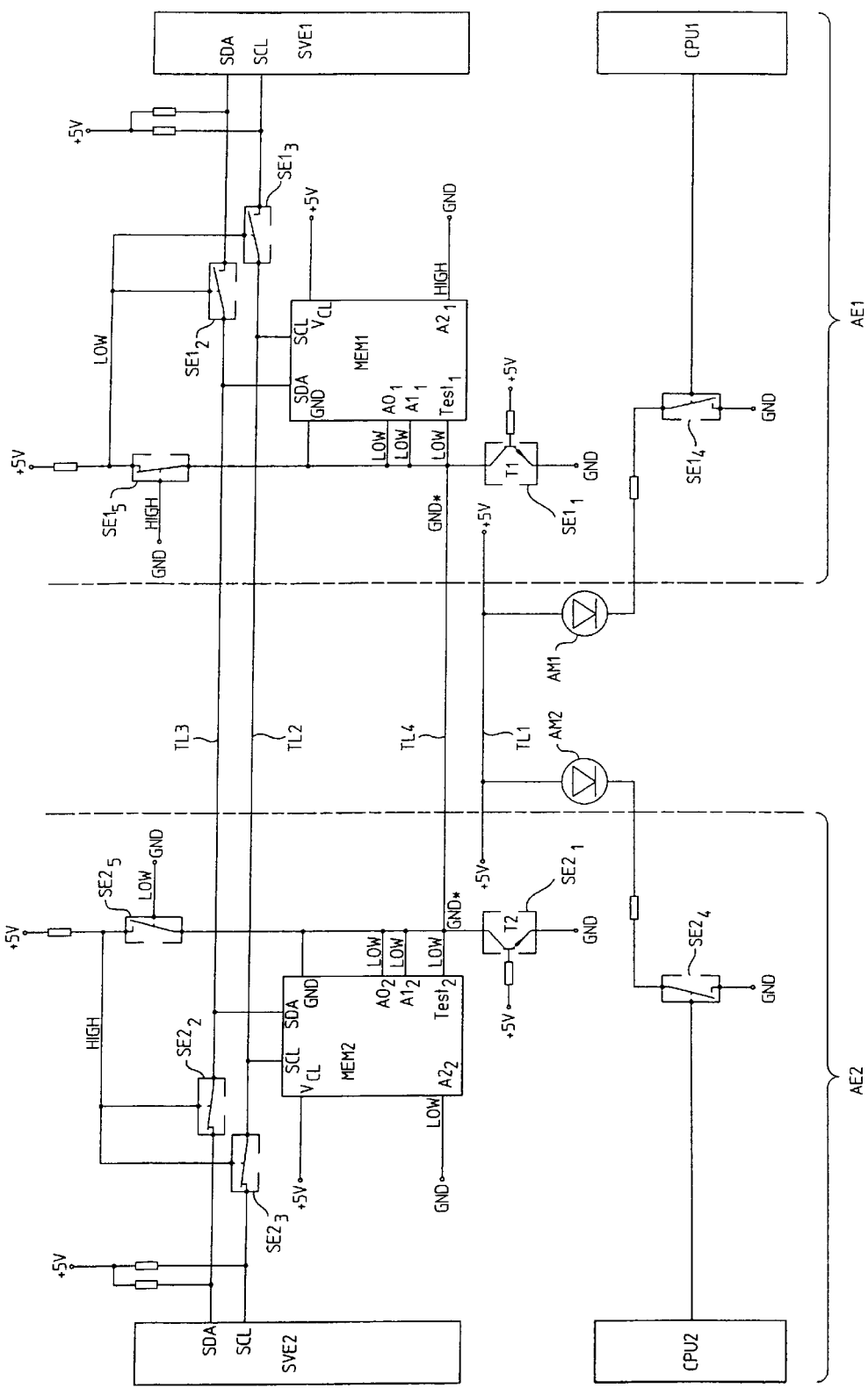
FIG. 3 is a detailed circuit diagram showing arrangements of two scanning units during the data transmission.

The present invention is described on the basis of an exemplary embodiment, which is depicted in FIGS. 2–4. In particular, an explanation follows of the procedure required when it becomes necessary to exchange the scanning unit of a position measuring device. The memory units having the specific data of the position measuring devices are disposed, in this exemplary embodiment, in the scanning units. However, the arrangement of the memory unit in the scanning unit is not essential to the present invention since the memory unit can be, for example, in a different location on the rotary position measuring device, or even on a circuit board.

FIG. 2 schematically depicts the two scanning units AE1 and AE2 of a position measuring device, when it is necessary to replace first scanning unit AE1 with second scanning unit AE2, due to a defect. During the replacement, new scanning unit AE2 is linked via line L with the downstream evaluation unit (not shown in FIG. 2) and is also supplied via line L with current. Scanning unit AE1 to be exchanged is already no longer connected on the output side with the evaluation unit. The two scanning units AE1 and AE2 are interconnected via a schematically indicated data transmission line DL. For this purpose, suitable detachable electrical connections are provided on the two scanning units AE1, AE2. These can be, for example, suitable plug-in connections or the like.

In this exemplary embodiment, data transmission line DL includes altogether four line components TL1–TL4, which are used to transmit information, or to partially supply current to scanning unit AE1 to be replaced. During the process, in one embodiment of the invention, line component TL3 is used to transmit data, and a clock signal for synchronizing the data transmission is transmitted via line component TL2. Line component TL4 interconnects the two ground connections of scanning units AE1, AE2, while the two connection terminals of scanning units AE1, AE2, which are connected to +5V, are interconnected via line component TL1. In the depicted exemplary embodiment, visual display means AM1, AM2 in the form of two LEDs, are integrated in line component TL1.

In the following description, further details will be discussed with regard to the functioning of display means AM1, AM2, in conjunction with the detailed description of the method according to the present invention.

In the place of data transmission line DL that is formed by a plurality of line components TL1–TL4, and within the scope of the present invention, alternative data transmission formats can also be used between the two scanning units AE1, AE2, and the memory units, respectively. For example, a suitable wireless data transmission system can also be used.

The two scanning units AE1 can be identical in design. The most important components of these two subassemblies are briefly explained in the following. In FIGS. 2 and 3, for the sake of clarity, those elements of scanning units AE1, AE2, used for producing the positionally dependent scanning signals are omitted. In the case of optical or photoelectric position measuring devices, the omitted elements can be, for example, a light source, one or a plurality of scanning graduations such as scanning scale graduation markings, as well as of one or a plurality of optoelectronic detector elements.

In the illustrated exemplary embodiment, each of the two scanning units AE1, AE2 can include a processor unit CPU1, CPU2, a signal processing unit SVE1, SVE2, a memory unit MEM1, MEM2, as well as a plurality of switching elements $SE1_1$, $SE1_2$, $SE1_3$, $SE1_4$ $SE2_1$, $SE2_2$, $SE2_3$, $SE2_4$. For clarity, not all of the switching elements of the scanning units are shown in FIG. 2.

The processor units CPU1, CPU2 are each used, inter alia, for synchronizing or controlling the signal processing sequences in the two scanning units AE1, AE2. The scanning signals detected in each case in signal processing units SVE1, SVE2 are processed and suitably conditioned for signal transmission to the evaluation unit. Writeable and readable memory units MEM1, MEM2, in turn, contain specific data of the position measuring device in question, which are required for operating the position measuring device. Memory units MEM1, MEM2 can be designed, for example, as EEPROMs. The data in question can be, for instance, data pertaining to the scale graduation section of an absolute position measuring device to be scanned by the particular scanning unit AE1, AE2. In addition, machine-specific data can likewise be stored, such as information pertaining to clock pulse number, zero adjustment, and other parameters.

In conjunction with the design of scanning units and the employed memory units explained in known methods heretofore, reference is additionally made to EP 0 660 209 BI of the Applicant. The functioning and significance of the various switching elements $SE1_1$, $SE1_2$, $SE1_3$, $SE1_4$ $SE2_1$, $SE2_2$, $SE2_3$, $SE2_4$ are explained in greater detail with reference to FIG. 4 and FIG. 3, in the course of the following description of the method according to the present invention, and of the system according to the present invention.

Instead of completely re-inputting the various data into the new, i.e. second memory unit MEM2, which is time-consuming, the present invention provides for transmitting and copying the data stored in the old, i.e. first memory unit MEM1, into the second memory unit MEM2, via a substantially automated data transmission. This eliminates the need for the more expensive, manual inputting and reconstruction of this data from the first memory unit MEM1.

One exemplary embodiment of the method according to the present invention is described with reference to the flow chart in FIG. 4. In a first method step S1, the two scanning units AE1 and AE2 are interconnected via a data transmission line DL.

In subsequent step S2, the new, i.e. second scanning unit AE2 is connected via line L to the evaluation unit. It is subsequently checked in step S3 via processor unit CPU2 of new scanning unit AE2 whether it is possible to access memory unit MEM1 of first scanning unit AE1, to determine whether the two scanning units AE1 and AE2 are, in fact, properly interconnected. If this is not the case, an initialization program begins in step S4a in processor unit CPU1, to set the processor unit in a functional operating state.

If, on the other hand, it is possible to access first memory unit MEM1, then in accordance with method step S4, at least one portion of the data of first memory unit MEM1 is transferred into second memory unit MEM2, so that once the data have been transmitted, the specific data of first memory unit MEM1 are at least partially contained in second memory unit MEM2. When the data transmission and copying procedure is concluded, it is subsequently checked in step S5 with the aid of second processor unit CPU2, whether the data transmission was correctly performed. This can be achieved, for example, by checking specific portions of the transmission protocol. As a function of this check test, a display means AM1, AM2 is then activated in step S6 to indicate whether the copying procedure was properly carried out. Display means AM1, AM2 can be activated via processor unit CPU2, which for this purpose, at least controls switching element $SE2_4$.

In the illustrated exemplary embodiment, visual display means AM1, AM2, can be LEDs, that when integrated in data transmission line DL, are used as display means AM1, AM2. For example, constant luminous operation of the LEDs indicates that the data transmission has been properly carried out. On the other hand, a flashing mode of the LEDs indicates that the data transmission was faulty. In this case, it is also possible to indicate or to encode the particular type of error encountered during data transmission through use of different flashing modes. For example, flashing two times followed by a pause can indicate a read error; flashing three times followed by a pause indicates, on the other hand, a write error, etc.

It is also possible in this manner to encode various types of errors and to activate the display means accordingly. The embodiment that uses the LEDs as visual display means AM1, AM2 merely represents one possible specific embodiment of suitable display means. In addition, provision could also be made, for example, for an indication on a suitable display, or for suitable acoustical indicator means.

In connection with display means AM1, AM2, as a general principle one single visual display means would suffice. However, to ensure when using LEDs that data transmission line DL can be connected independently of direction to the two scanning units AE1, AE2, two LEDs are provided in this preferred exemplary embodiment as visual display means AE1, AE2.

If it is ascertained in this manner that the data transmission has been successfully carried out, then the data transmission is ended. If, on the other hand, an error is indicated via display means AM1, AM2, then the particular user can implement the method according to the present invention once again or, if indicated, several times, until a correct data transmission is achieved. Accordingly, data are transmitted in an operator-friendly manner from first memory unit MEM1 of scanning unit AE1 to be replaced, into memory unit MEM2 of new scanning unit AE2.

Further details concerning the circuit engineering of one specific embodiment of the device according to the present invention are described in the following discussion, with reference to FIG. 3. In FIG. 3, the detailed circuit arrangements of the two scanning units AE1 and AE2 are depicted during the course of the data transmission. As explained at the outset, second scanning unit AE2 is connected to the downstream—not illustrated—evaluation unit. This unit, according to the present invention, merely supplies current to the new, second scanning unit AE2 via the two lines +5V, GND.

On the part of second scanning unit AE2, transistor T2 is switched into conduction for the data transmission. In this case, the transistor T2 base is connected via a resistor to +5V, and the emitter to GND. Except for 0.1V, line GND* is identical to GND. Applied to the control input of switching element $SE2_5$, not shown in FIG. 2, there is a logic LOW level, which results in switching element $SE2_5$ remaining open. Therefore, the two other switching elements $SE2_2$ and $SE2_3$ remain closed. Address lines $A0_2$, $A1_2$, $TEST_2$, as well as $A2_2$ of memory unit MEM2 are each connected to logic LOW level. Thus, by way of the illustrated circuit elements, a sufficient current supply for memory unit MEM2 is ensured.

Scanning unit AE1 is linked to scanning unit AE2 via line components TL1–TL4 of data transmission line DL. By way of the depicted connection variant, it is ensured that scanning unit AE1 is not connected to GND, but rather to GND*. Due to the selected component configuration, a resistance of approximately 300 Ω is applied between +5V and GND, so that all GND connections have a potential of nearly +5V. This, in turn, has the effect that switching element $SE1_1$ of scanning unit AE1, designed as transistor T1, is closed. Accordingly, a logic HIGH level is applied to the control input of switching element $SE1_5$, so that switching element $SE1_5$ is closed. This, in turn, gives rise to switching elements $SE1_2$ and $SE1_3$ being opened, so that memory unit MEM1 of first scanning unit AE1 is separated from signal processing unit SVE1.

Even in the case of a defective signal processing unit SVE1, this system ensures that memory unit MEM1 can be read out. Memory unit MEM1, as well as switching elements $SE1_1$–$SE1_5$ are supplied during the data transmission on the part of first scanning unit AE1 via GND* and +5V on line components TL4, TL1. First memory unit MEM1 is connected, for purposes of data transmission, to second scanning unit AE2, i.e., to second memory unit MEM2 via line components TL2, TL3. Address lines $AO_1$, $Al_1$ and $TEST_1$ of memory unit MEM1 are all connected, in turn, to logic LOW level. On the other hand, due to the circuit configuration selected, address line $A2_1$ is connected in this state to logic HIGH level. Accordingly, the distinction can be made between the two memory units MEM1, MEM2 in the step described above, on the basis of the differing levels of address lines $A2_1$ (LOW) and $A2_2$ (HIGH).

The described circuit arrangement also ensures that, during data transmission, the current consumption rises only by the amount of current consumption of one memory unit, as well as by the amount of current consumption of the switching elements. This is important insofar as the downstream evaluation unit that normally provides a current supply to the scanning units, is only designed for supplying one single scanning unit.

The circuit arrangement described above represents only one possible exemplary embodiment of the invention. A number of other advantageous possible implementations exist, which are also within the scope of the invention.

What is claimed is:

1. A method for transmitting data among a first and second memory unit of at least one position measuring device, said data being stored in a first one of the memory units comprising:
   connecting the memory units with a data transmission line;
   transmitting the data from the first memory unit into the second memory unit, such that after the data are transmitted, the data of the first memory unit are at least partially contained in the second memory unit; and
   replacing the first memory unit with the second memory unit;
   wherein the data is specific for operation of a particular position measuring device, the position measuring device includes a scale and a scanning unit movably arranged in measuring relation thereto to produce position-dependent scanning signals by scanning the scale, the scanning signals transmitted to a downstream evaluation unit.

2. The method as recited in claim 1, further comprising:
   checking if access to the data in the first memory is possible; and if access is possible, transmitting the data automatically as soon as it is checked.

3. The method as recited in claim 1, further comprising indicating via a display whether the data transmission is succesful.

4. The method as recited in claim 3, wherein the display comprises a visual display having at least one LED, and is integrated in the data transmission line.

5. The method as recited in claim 4, further comprising indicating a correct data transmission by steadily lighting the at least one LED, and indicating an incorrect data transmission by flashing the at least one LED.

6. The method as recited in claim 5, further comprising displaying a plurality of flashing modes to indicate an incorrect transmission, a different error being assigned to each of the flashing modes.

7. The method as recited in claim 3, further comprising displaying a type of transmission error during data transmission with the display means.

8. The method as recited in claim 2, wherein the first and second memory units are arranged in a first and second scanning unit of a position measuring device.

9. The method as recited in claim 8, further comprising supplying with power from the first scanning unit during data transmission only the first memory unit and the at least one switching element.

10. The method as recited in claim 8 further comprising:
a) interconnecting the first and second scanning unit via a data transmission line;
b) connecting the second scanning unit to a supply line;
c) checking whether it is possible from the second scanning unit to access the first memory unit with the data stored therein;
d) if access to the first memory unit is possible, at least partially transmitting the data from the first memory unit into the second memory unit; and
e) activating display means to indicate whether the data transmission has proceeded correctly.

11. A system for transmitting data among a first and second memory unit of at least one position measuring device, the data being stored in the memory units, comprising:
a data transmission line adapted to connect the memory units to transmit data from a first memory unit into a second memory unit;
means for controlling transmission of the data such that once the data are transmitted, the data of the first memory unit are at least partially stored in the second memory unit; and
means for replacing the first memory unit with the second memory unit;
wherein the data is specific for operation of a particular position measuring device, the position measuring device includes a scale and a scanning unit movably arranged in measuring relation thereto to produce position-dependent scanning signals by scanning the scale, said scanning signals transmitted to a downstream evaluation unit.

12. The system as recited in claim 11, further comprising at least one display means adapted to indicate data transmission status.

13. The system as recited in claim 12, wherein the at least one display means comprise at least one LED integrated in the data transmission line.

14. The system as recited in claim 11, wherein the memory units are disposed in a first and second scanning unit respectively.

15. The system as recited in claim 14, further comprising a processor unit disposed in the first and second scanning units.

16. The system as recited in claim 15, wherein the processor unit is linked to display means, the processor unit activating the display means in response to one of a correct and incorrect data transmission.

17. The system as recited in claim 14, further comprising detachable, electrical connections formed on the first and second scanning units for the data transmission line.

18. The system as recited in claim 14, further comprising a plurality of switching elements disposed in the first and second scanning units, said plurality of switching elements being operable so that at least the first and second memory unit of the first and second scanning units are supplied with current during data transmission.

19. A method for transmitting data among memory units of at least one position measuring device, said data being stored in a first one of the memory units comprising:
connecting the memory units with a data transmission line;
transmitting the data from the first memory unit into a second memory unit, such that after the data are transmitted, the data of the first memory unit are at least partially contained in the second memory unit; and
indicating via a display whether the data transmission is successful;
wherein the position measuring device includes a scale and a scanning unit movably arranged in measuring relation thereto to produce position-dependent scanning signals by scanning the scale, said scanning signals transmitted to a downstream evaluation unit.

20. The method according to claim 19, wherein the display includes a visual display having at least one LED and is integrated in the data transmission line.

21. The method according to claim 20, further comprising:
indicating a correct data transmission by steadily lighting the at least one LED; and
indicating an incorrect data transmission by flashing the at least one LED.

22. The method according to claim 21, further comprising:
displaying a plurality of flashing modes to indicate an incorrect transmission, a different error assigned to each of the flashing modes.

23. The method as recited in claim 19, further comprising:
displaying a type of transmission error during data transmission with the display.

24. A system for transmitting data among a first and second memory unit of at least one position measuring device, the data being stored in the memory units, comprising:
a data transmission line adapted to connect the memory units to transmit data from a first memory unit into a second memory unit;
an arrangement configured to control transmission of the data such that once the data are transmitted, the data of the first memory unit are at least partially stored in the second memory unit; and
an arrangement configured to replace the first memory unit with the second memory unit;
wherein the data is specific for operation of a particular position measuring device, the position measuring device includes a scale and a scanning unit movably arranged in measuring relation thereto to produce position-dependent scanning signals by scanning the scale, said scanning signals transmitted to a downstream evaluation unit.

25. The system as recited in claim 24, further comprising at least one display device adapted to indicate data transmission status.

26. The system as recited in claim 25, wherein the at least one display device includes at least one LED integrated in the data transmission line.

27. The system as recited in claim 24, wherein the memory units are disposed in a first and second scanning unit respectively.

28. The system as recited in claim 27, further comprising a processor unit disposed in the first and second scanning units.

29. The system as recited in claim 28, wherein the processor unit is linked to a display device, the processor unit configured to activate the display device in response to one of a correct and incorrect data transmission.

30. The system as recited in claim 27, further comprising detachable, electrical connections formed on the first and second scanning units for the data transmission line.

31. The system as recited in claim 28, further comprising a plurality of switching elements disposed in the first and second scanning units, said plurality of switching elements operable so that at least the first and second memory unit of the first and second scanning units are supplied with current during data transmission.

* * * * *